Patented Mar. 31, 1953

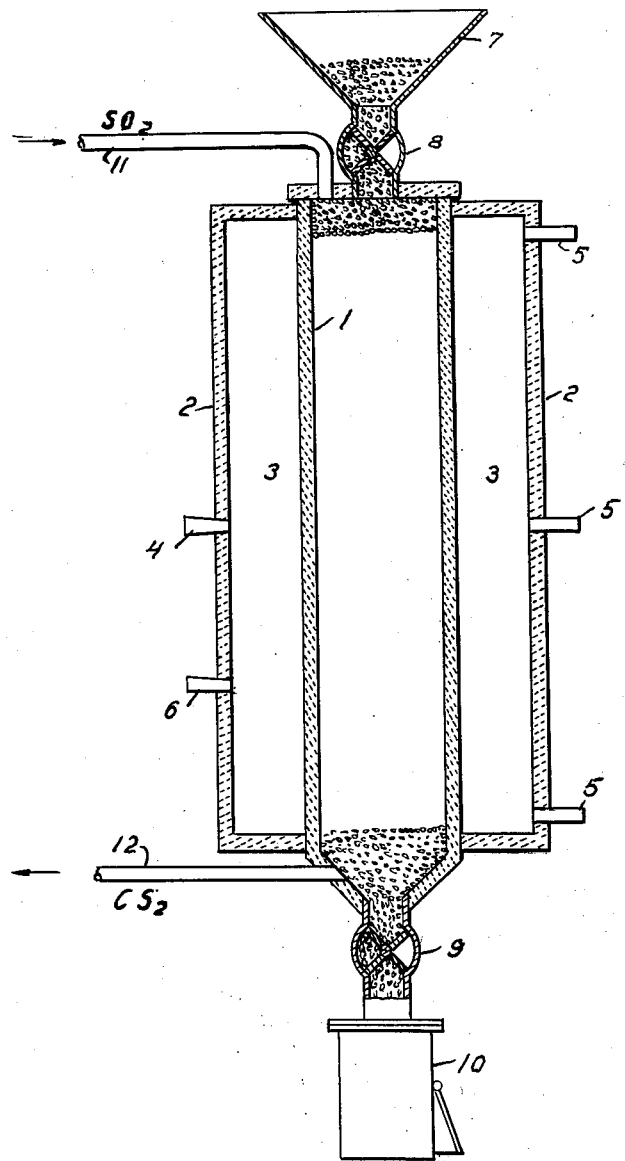

2,633,409

UNITED STATES PATENT OFFICE 2,633,409

PRODUCING CARBON DISULFIDE

Joseph J. Wimberly, College Park, Ga., assignor to The New Jersey Zinc Company, New York, N. Y., a corporation of New Jersey Application March 18, 1950, Serial No. 150,436

4 Claims. (Cl. 23—206)

This invention relates to the production of carbon disulfide and, more particularly, to the production of carbon disulfide by reaction between carbon and sulfur dioxide.

In the United States patent to Gamble et al., No. 2,443,383, there is described a method of producing carbon disulfide wherein sulfur dioxide is introduced into a body of active carbon maintained at a temperature of 600° to 900° C., and the resulting gaseous product is passed into a further body of active carbon maintained at a temperature above 1100° C. whereby the initial sulfur dioxide is largely converted to carbon disulfide. The body of carbon is provided in the form of a permeable column thereof maintained within an externally heated retort provided at the top with a charge hopper and at the bottom with discharge device for withdrawing partially spent carbon and ash. The sulfur dioxide is introduced into the lower end of the carbon column and the carbon disulfide-containing gaseous product is removed from the upper end of the column. The resulting relative movements of the carbon and sulfur dioxide are countercurrent. The incoming and relatively cool sulfur dioxide is thus brought into contact with the hot carbon in the lower portion of the column wherein a temperature of 600° to 900° C. prevails, and the resulting relatively hot gaseous product is brought into contact with the carbon in the upper portion of the column wherein the carbon is maintained at a temperature above 1100° C. by external heating. The reacting carbon and sulfur dioxide in the lower portion of the column produce carbon oxysulfide, and this oxysulfide is converted to carbon disulfide in the upper portion of the column wherein the high temperature required for this conversion prevails.

I have now found that the effectiveness of a column of active carbon for converting sulfur dioxide to carbon disulfide can be increased appreciably if the sulfur dioxide is passed concurrently with the carbon downwardly through the retort. Thus, the method of producing carbon disulfide in accordance with my invention comprises establishing and maintaining in a vertically disposed retort a downwardly moving permeable body of active carbon progressively heating the body of carbon in its downward movement through the retort to a temperature of at least 1200° C., and preferably at least 1300° C., passing sulfur dioxide downwardly through said heated body of carbon, and withdrawing the resulting carbon disulfide-containing gaseous product from the lower portion of said body at a temperature below that at which excessive dissociation of the carbon disulfide occurs. By progressively heating the body of carbon as it moves downwardly through the retort, the temperature of the carbon, as it is increased from the charging temperature to its ultimate temperature of at least 1200° C., passes through a range (about 600°–900° C.) conducive to the conversion of the sulfur dioxide to carbon oxysulfide. The subsequent conversion of the carbon oxysulfide to carbon disulfide in its further passage downwardly through the retort takes place predominately in that portion of the body of carbon which has been raised to a temperature of at least 1200° C.

Although countercurrent flow of reactants present in different states, such as a solid and a gas, is generally more efficacious than concurrent flow, I have found that the opposite is true in the case of contacting carbon and sulfur dioxide under temperature conditions conducive to the production of carbon disulfide. This unexpected result can be explained in terms of the unusual conditions prevailing in the reaction under consideration, although it must be understood that the invention is not to limited by such theorizing. The conversion of sulfur dioxide to carbon oxysulfide in the presence of carbon at a temperature of 600° to 900° C. proceeds readily, but the subsequent conversion of the carbon oxysulfide to carbon disulfide in the presence of carbon at a temperature above 1100° C. proceeds more slowly. Accordingly, in the countercurrent method of the aforementioned Gamble et al. patent, it is wholly logical to expect the introduction of sulfur dioxide into the lower hot portion of the carbon body to be advantageous in heating the gas and its resulting reaction products prior to the introduction of the latter into the high temperature zone of the carbon body. As pointed out in the Gamble et al. patent, the active carbon charged to the retort is further activated by the action thereon of the sulfur-bearing gases. Thus, in this countercurrent flow method, the carbon in the lower portion of the body thereof is more active than that in the upper portion with the result that the more active carbon is available for the reaction that proceeds readily and the less active carbon is present in the upper portion of the column wherein the more difficult reaction is effected. In the concurrent flow of reactants pursuant to my present invention, the reaction which takes place more readily occurs in the upper portion of the descending charge of carbon and promptly further activates the column so that the more active carbon is available in the remainder of the column wherein the more difficult task of converting the carbon oxysulfide to carbon disulfide at a high temperature is accomplished. A further advantage in my concurrent flow method resides in the geometry of the high temperature portion of carbon body as compared with that of the countercurrent flow method. In both methods, the carbon charge is heated externally with the result that a temperature gradient is present in the upper portion of the charge. In the countercurrent flow method, this temperature gradient extends into the region of the charge in which the high temperature reaction is carried out so that the ascending carbon oxysulfide first encounters the desired high temperature carbon but subsequently passes upwardly through the temperature gradient zone in which progressively less effective conversion temperatures prevail. In my concurrent flow method, on the other hand, the carbon oxysulfide is produced in the aforementioned temperature gradient zone and then is in contact only with carbon maintained at the desired conversion temperature throughout the remainder of its downward passage through the retort.

Whether the foregoing discussion offers the complete or only a partial explanation of the advantages of my concurrent flow method over the countercurrent flow method of the Gamble et al. patent, the fact remains that with apparatus and carbon bodies of substantially identical size and substance, and with substantially the same heat input into the reaction masses so as to obtain similar degrees of conversion of the sulfur dioxide to carbon disulfide, the concurrent flow method so increases the capacity of the reactor as to make possible the production of at least 50% more carbon disulfide than is possible in the countercurrent flow method.

The single figure of the accompanying drawing diagrammatically illustrates, in sectional elevation, a suitable apparatus for the practice of the invention in a continuous manner.

The apparatus of the drawing has an externally heated retort 1 which is constructed of silicon carbide or other refractory material capable of operating at temperatures above 1200° C. and preferably up to 1300° C. or higher. The retort is enclosed in a furnace structure 2 defining a heating chamber 3 which may be fired with gas, oil or other suitable fuel in conventional manner. For the purpose of illustration, the heating chamber is shown as fired by a fuel burner 4 with outlets 5 for exhaust products of combustion. Although the heating chamber may be fired satisfactorily by a single burner 4 positioned centrally of the chamber, an additional burner 6 may be provided adjacent the lower portion of the chamber in order to aid in heating the lower portion of the carbon bed. A charge hopper 7 having a substantially gas-tight feeding device 8 is mounted above the retort 1. The bottom of the retort is equipped with a discharge device 9 emptying into an ash pit 10 or the like. The retort is further provided with a gas inlet pipe 11 at the top for delivering sulfur dioxide thereinto and with an outlet pipe 12 at the bottom for withdrawing carbon disulfide.

In practicing the invention in the apparatus of the invention, the retort is filled with carbon and the heating chamber is fired to establish and maintain a temperature of at least 1200° C. within the major portion of the body of carbon within the retort. Sulfur dioxide is introduced into the top of the retort through the inlet pipe 11. In its passage downwardly through the retort, the sulfur dioxide is heated by contact with the hot carbon, and when raised to a temperature of about 600° C. the sulfur dioxide reacts vigorously with the carbon with the liberation of heat and the formation of carbon oxysulfide (COS). The exothermic heat of reaction supplements the heat applied to the carbon from the heating chamber 3 and aids in raising the temperature of the carbon in the upper portion of the body thereof to a temperature of at least 1200° C. The gaseous products containing carbon oxysulfide continue downwardly through the bed of carbon thus heated to a temperature of at least 1200° C. wherein the carbon oxysulfide is converted to carbon disulfide which is withdrawn through the outlet pipe 12. It is my present belief that the conversion of the carbon oxysulfide to carbon disulfide in the presence of the hot carbon is a two-stage operation, the carbon oxysulfide first being dissociated in the presence of the hot carbon to form elemental sulfur (probably either monatomic or diatomic sulfur) and the resulting elemental sulfur reacting with the hot carbon to produce carbon disulfide. The reaction between the carbon and the sulfur-bearing gases passing therethrough at least partially consumes the carbon in the bed, and this consumption of carbon, together with the discharge of some carbon with the ash removed from the lowermost end of the retort, necessitates substantially continuous feeding of carbon from the charge hopper 7 into the top of the retort. Thus, the carbon within the retort progressively descends therethrough concurrently with flow of sulfur-bearing gases. The carbon disulfide is recovered from the gases withdrawn through the outlet pipe 12 in any appropriate manner, as, for example, by refrigeration and consequent condensation of the carbon disulfide, or by scrubbing with liquid solvents for carbon disulfide such as oils and the like. After the carbon disulfide has been recovered from the exhaust gases, the residual gas, which consists largely of carbon monoxide, may be used with advantage in firing the retort or for any other desired purpose. Any unconsumed carbon removed from the bottom of the retort with the discharged ash may be separated from the ash and used as part of the carbon delivered to the charge hopper. Indeed, the extremely active condition of the carbon so recycled contributes materially to the over-all effectiveness of the process.

The carbon used in the practice of the invention may be low temperature bituminous coke, anthracite coal, charcoal, activated carbon, or other active or black carbonaceous material. Inactive or gray carbon, such as most metallurgical coke or graphite, is not suitable for the purposes of the invention. Coke produced by low temperature distillation of bituminous coal appears to be as effective as any other form of active carbon in practicing the method of our invention and is preferred because of its low cost. Although anthracite coal can be used directly, it is preferable to preheat the coal so as to drive off moisture and volatile hydrocarbon constituents which would otherwise dilute and contaminate the carbon disulfide in the exit gas stream. The temperature and duration of the preheating of the carbon used in practicing the invention is dependent upon the type and source of carbon used. In general, preheating at temperatures of 500° to 800° C. for periods of one to two hours is adequate, the upper limit of temperature and duration in these ranges (i. e. heating at 800° C. for two hours) being preferred for most anthracite coals.

The particles of solid carbon should be of such size as to provide a permeable column which permits free flow of gases therethrough. The only limitations on the size of the carbon particles are the necessity of providing adequate contact between the carbon and gas and the avoidance of excessive resistance to gas flow. In general, the larger particle sizes promote better heat transfer from the heating chamber to the interior of the charge and the smaller particle sizes offer a greater surface area for contact with the gases. Consequently, it is desirable to use a size of carbon particle between egg size (which presents too little effective contact surface) and dust size (which offers too great resistance to gas flow and also has poor heat conducting characteristics).

The sulfur dioxide used in practicing the invention may be the substantially pure gas free from diluent gases or may be only one of the components of a mixture of gases in which the sulfur dioxide preferably constitutes 6% or more by volume of the mixture. Roaster gases containing for example about 8% by volume of sulfur dioxide, about 8% by volume of oxygen and the remainder substantially only nitrogen, can also be used effectively. If desired in the interest of heat conservation, the sulfur dioxide gas can be preheated to a temperature of say about 500° C., but this step is not required for effective operation.

The ultimate temperature to which the carbon must be heated in the course of its movement downwardly through the retort should be at least 1200° C. for effective production of carbon disulfide, and preferably above 1300° C. for greater efficiency. It will be appreciated, of course, that the aforementioned reaction temperatures are those prevailing in the major central portion of the body of carbon and that the upper and lower portion of the body adjacent the extremities of the heating chamber will be substantially cooler. The only upper limit for the reaction temperature is that dictated by the refractory of which the retort is constructed. With this practical limitation in mind, it can be safely stated that the higher the reaction temperature the greater will be the capacity of the equipment at gas velocities through the carbon bed which result in substantially the same reaction efficiencies of 80% or higher.

It will be appreciated, however, that the highest reaction temperature prevailing within the carbon body will not necessarily be a suitable temperature for that at which the carbon disulfide-containing gaseous product is withdrawn from the body. That is, it is well known that carbon disulfide dissociates with the formation of elemental sulfur at elevated temperatures, the degree of dissociation increasing with increasing temperature. Accordingly, the carbon disulfide product should be withdrawn from the carbon body in the practice of my invention at a temperature below that at which excessive dissociation of the carbon disulfide occurs. The degree of dissociation which will be considered excessive will naturally depend upon economic conditions peculiar to each operating set-up. It is presently believed that the dissociation of carbon disulfide in the gaseous product which occurs at temperatures above 1400° C. will be excessive by most standards but that a somewhat greater degree of dissociation may be tolerated under special conditions.

The gas velocity through the carbon bed, flowing concurrently with the carbon in accordance with the invention, is not critical and is subject only to the limitation that increasing gas velocity progressively lowers the reaction efficiency. This effect is readily apparent in the following examples wherein the production of carbon disulfide by concurrent flow of carbon and sulfur dioxide was carried out in a silicon carbide retort comprising a tube having an over-all length of 54 inches of which the central 30 inches were enclosed in a fuel-fired heating chamber maintained at a temperature of approximately 1350° C. The carbon charged to the retort comprised anthracite coal preheated as aforesaid and having an average particle size of about 5/8 inch. When substantially pure sulfur dioxide gas was passed through this bed of active carbon in the retort at a velocity of 0.011 foot per minute (calculated on the basis of the gas at room temperature flowing through the retort while empty), the reaction efficiency (the percentage of the sulfur in the sulfur dioxide converted to carbon disulfide) was substantially 89%. When the sulfur dioxide charge rate was increased to produce similarly calculated flow velocities of 0.016, 0.026 and 0.046 foot per second, the reaction efficiencies were found to be 86.4%, 85.8% and 83%, respectively.

It has been pointed out hereinbefore that the concurrent flow of carbon and sulfur-bearing gas in accordance with the invention leads to greater production capacity than with countercurrent flow of reactants in the same size retort. This difference prevails when the two types of operation are carried out at substantially the same retort temperature. Conversely, the concurrent flow method makes possible the attainment of substantially the same capacity and reaction efficiency as that obtained by the countercurrent flow method when a lower temperature is used in the former than in the latter. For example, using the same retort charged and operated with preheated pea size anthracite coal and passing concentrated sulfur dioxide therethrough, a reaction efficiency of about 85 to 90% was obtained with concurrent flow at a retort temperature of 1300° C. whereas with countercurrent flow this reaction efficiency could be obtained only by raising the retort temperature to somewhat above 1400° C. At 1300° C., the countercurrent flow method under the aforementioned conditions resulted in a reaction efficiency of only about 70 to 75%.

It will be seen, accordingly, that the concurrent contacting of carbon and sulfur dioxide at temperatures of at least 1200° C. in accordance with the invention effects an unexpected and significant improvement over the prior art countercurrent contacting of these reactants. At comparable reaction temperatures, the concurrent flow method leads to increased reaction efficiency and production capacity, whereas when operated to obtain comparable reaction efficiency the concurrent flow method makes possible the use of lower reaction temperatures than those required for the countercurrent flow method. A further significant advantage of the concurrent flow procedure resides in the fact that a non-combustible atmosphere of sulfur dioxide prevails in the upper end of the retort where the carbon is charged, whereas in the countercurrent flow procedure the atmosphere prevailing in the carbon-charging zone at the top of the retort consists essentially of a more hazardous mixture of carbon disulfide and carbon monoxide.

I claim:

1. The method of continuously producing carbon disulfide which comprises establishing and maintaining in a vertically disposed retort a downwardly moving permeable body of active carbon, progressively heating the body of carbon in its downward movement to a maximum temperature of at least 1200° C. and causing the lower portion of said body to cool appreciably below said maximum temperature, passing sulfur dioxide downwardly through and concurrently with said heated body of carbon and thus first through a progressively increasing temperature gradient up to said temperature of at least 1200° C. and thereafter through a progressively decreasing temperature gradient, and withdrawing the resulting carbon disulfide-containing gaseous product from the lower portion of said body at a temperature below that at which excessive dissociation of the carbon disulfide occurs.

2. The method of continuously producing carbon disulfide which comprises establishing and maintaining in a vertically disposed retort a downwardly moving permeable body of active carbon, progressively heating the body of carbon in its downward movement to a maximum temperature of at least 1300° C. and causing the lower portion of said body to cool appreciably below said maximum temperature, passing sulfur dioxide downwardly through and concurrently with said heated body of carbon and thus first through a progressively increasing temperature gradient up to said temperature of at least 1300° C. and thereafter through a progressively decreasing temperature gradient, and withdrawing the resulting carbon disulfide-containing gaseous product from the lower portion of said body at a temperature below that at which excessive dissociation of the carbon disulfide occurs.

3. The method of continuously producing carbon disulfide which comprises establishing and maintaining in a vertically disposed retort a downwardly moving permeable body of anthracite coal conditioned by preheating at about 800° C. for about two hours, progressively heating the body of coal in its downward movement to a maximum temperature of at least 1200° C. and causing the lower portion of said body to cool appreciably below said maximum temperature, passing sulfur dioxide downwardly through and concurrently with said heated body of coal and thus first through a progressively increasing temperature gradient up to said temperature of at least 1200° C. and thereafter through a progressively decreasing temperature gradient, and withdrawing the resulting carbon disulfide-containing gaseous product from the lower portion of said body at a temperature below that at which excessive dissociation of the carbon disulfide occurs.

4. The method of continuously producing carbon disulfide which comprises establishing and maintaining in a vertically disposed retort a downwardly moving permeable body of low temperature bituminous coke, progressively heating the body of coke in its downward movement to a maximum temperature of at least 1200° C. and causing the lower portion of said body to cool appreciably below said maximum temperature, passing sulfur dioxide downwardly through and concurrently with said heated body of coke and thus first through a progressively increasing temperature gradient up to said temperature of at least 1200° C. and thereafter through a progressively decreasing temperature gradient, and withdrawing the resulting carbon disulfide-containing gaseous product from the lower portion of said body at a temperature below that at which excessive dissociation of the carbon disulfide occurs.

JOSEPH J. WIMBERLY.

REFERENCES CITED

The following references are of record in the file of this patent:

UNITED STATES PATENTS

| Number | Name | Date |
| --- | --- | --- |
| 2,141,766 | Silsby | Dec. 27, 1938 |
| 2,141,768 | Silsby | Dec. 27, 1938 |
| 2,443,383 | Gamble | June 15, 1948 |